United States Patent [19]

White

[11] 4,193,576
[45] Mar. 18, 1980

[54] SELF-FLUSHING BALL SEAL DISCONNECT

[75] Inventor: Jack E. White, Carson City, Nev.

[73] Assignee: J & D Enterprises, Carson City, Nev.

[21] Appl. No.: 956,982

[22] Filed: Oct. 31, 1978

Related U.S. Application Data

[63] Continuation-in-part of Ser. No. 865,923, Dec. 30, 1977.

[51] Int. Cl.² .............................................. F16L 37/28
[52] U.S. Cl. .................. 251/149.6; 137/322; 285/377
[58] Field of Search ............... 251/149.1, 149.2, 149.3, 251/149.4, 149.5, 149.6, 149.7; 137/322, 614.02, 614.03, 614.04, 614.05, 614.06, 539; 285/328, 353, 384, 377

[56] References Cited

U.S. PATENT DOCUMENTS

| | | | |
|---|---|---|---|
| 98,774 | 1/1870 | Johnson et al. | 285/377 |
| 807,417 | 12/1905 | Caskey | 285/377 X |
| 1,740,015 | 12/1929 | Hooper et al. | 251/149.6 |
| 2,134,382 | 10/1938 | Thompson | 251/149.5 X |
| 2,797,703 | 7/1957 | Edwards | 137/539 |
| 3,104,088 | 9/1963 | Cator | 251/149.6 |
| 3,104,120 | 9/1963 | Myers | 285/328 X |
| 3,163,178 | 12/1964 | Stratman | 137/614 |
| 3,284,112 | 11/1966 | Martin | 285/328 |
| 3,302,662 | 2/1967 | Webb | 137/539 |
| 3,348,575 | 10/1967 | Simak | 137/614.05 |
| 3,353,724 | 11/1967 | Johnston | 137/322 X |
| 3,478,762 | 11/1969 | McCullough | 137/614.05 X |
| 3,538,950 | 11/1970 | Portenels | 251/149.6 X |
| 3,592,439 | 7/1971 | Ritchie, Jr. | 251/149.4 X |
| 3,626,980 | 12/1971 | Svensson | 137/614.2 |
| 3,642,037 | 2/1972 | Cunningham | 137/614.04 X |
| 3,768,102 | 10/1973 | Kwan-Gett et al. | 137/539 |
| 3,777,771 | 12/1973 | De Visscher | 251/149.6 X |

*Primary Examiner*—William R. Cline
*Attorney, Agent, or Firm*—Browdy and Neimark

[57] ABSTRACT

A self-flushing ball seal disconnect coupling assembly for use in field irrigation systems, or other fluid distribution systems, comprises two parts which mate together axially. The first part, which contains a valve ball, is connected to the lateral, or field supply line, or other fluid supply line. The ball is urged by spring fingers and fluid pressure toward a sealing position, which it assumes when the first part is disconnected from the second part, the latter having a nose member which, under coupling conditions, pushes the ball off its seat thereby releasing flow of fluid through the coupling assembly. A clamping ring assembly surrounds the abutting ends of the first and second parts and locks said parts in axially aligned mating positions. The second part is connected to an upright, or irrigation head, or other element to be supplied with fluid.

23 Claims, 9 Drawing Figures

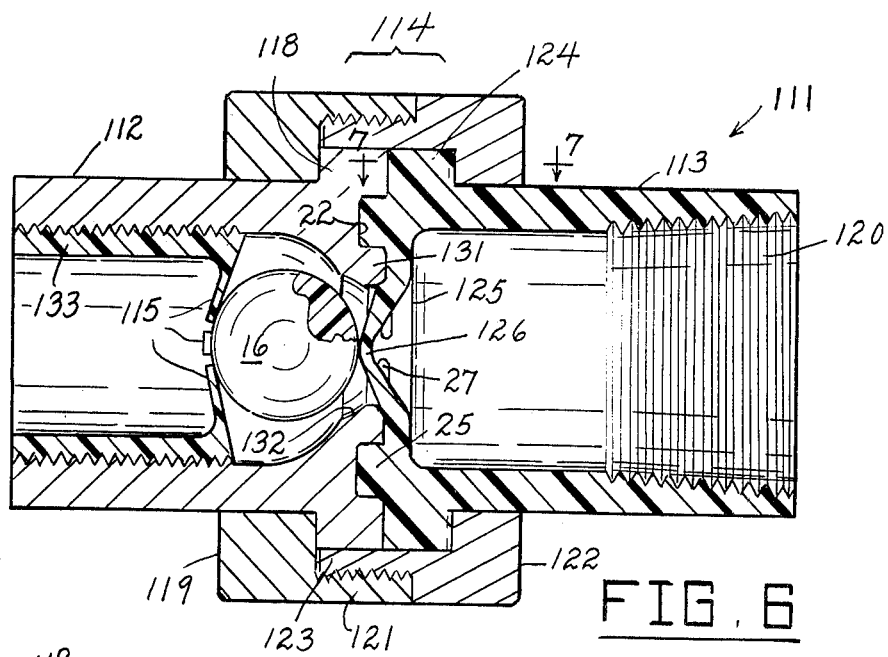
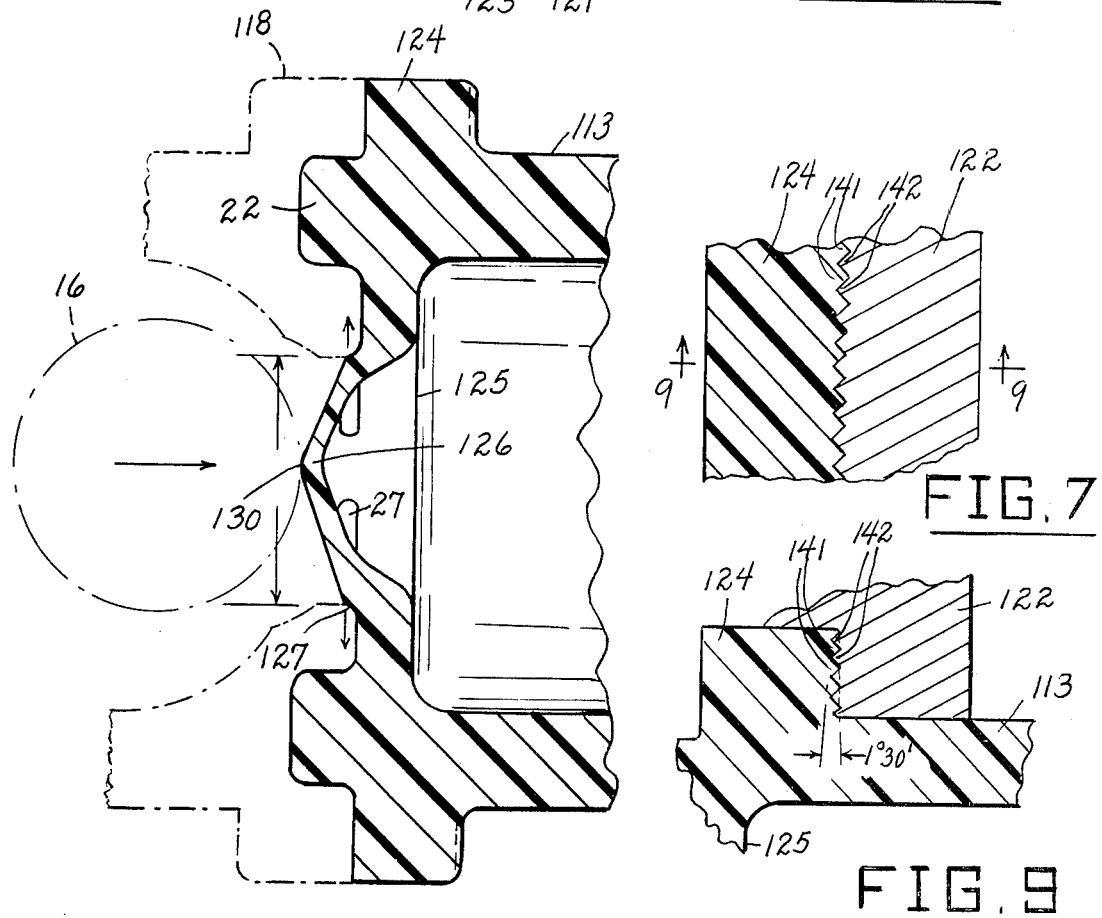

SELF-FLUSHING BALL SEAL DISCONNECT

This is a continuation-in-part of U.S. application Ser. No. 865,923, filed Dec. 30, 1977, and entitled "Self-Flushing Ball Seal Disconnect for Field Irrigation Systems".

FIELD OF THE INVENTION

This invention relates to detachable conduit coupling devices, and more particularly to self-sealing conduit-disconnecting coupling assemblies for use in field irrigation and other fluid distribution systems.

BACKGROUND OF THE INVENTION

In field irrigation systems, the upright, or ground irrigation heads are connected to lateral, or field supply conduits, the latter of which may supply water to a number of such irrigation heads. It is often necessary to disconnect an irrigation head from its supply conduit because the irrigation head must be removed for repair or replacement; this should be possible without affecting the supply of water to the other irrigation heads also connected to the same supply conduit. For this purpose, so-called "disconnects" are provided at the junctions between the local conduits feeding the irrigation heads and the field supply line. These disconnects are intended to allow the respective heads to be individually disconnected without disrupting the water supply to the remainder of the irrigation heads. The devices previously used for this purpose have proven to be unsatisfactory, mainly due to the failure because of contamination of the sealing parts, such failure occurring because of no provision for adequate flushing during the connect and disconnect cycles.

The same considerations apply with respect to other fluid distribution systems using automatic disconnects between fluid supply lines and local conduits feeding devices to be supplied with working fluid, such as hydraulic fluid distribution systems and pneumatic fluid distribution systems, as well as domestic irrigation systems.

A preliminary search of the prior art shows the following representative U. S. patents as indicating the present state of the art: Nos.

2,797,703—Edwards
3,163,178—Stratman
3,348,575—Simak
3,478,762—McCullough
3,626,980—Svensson
3,642,037—Cunningham

SUMMARY OF THE INVENTION

Accordingly, an object of the invention is to overcome the deficiencies and disadvantages of the previously known disconnectable devices used in field irrigation and other fluid distribution systems.

Another object is to provide improved field irrigation ; yet another object is to provide for a more efficient and better disconnectable coupling device for use in a field irrigation system.

A further object of the invention is to provide a novel and improved disconnectable coupling assembly of the self-sealing ball valve type for use between a lateral, or field supply line, and a conduit leading to an upright, or ground irrigation head, or between a fluid supply line and a conduit leading to a fluid-receiving device, which has a self-flushing capability both during connect and disconnect, and which thereby minimizes contamination and fouling, and which prolongs the useful life of the coupling assembly, and which is highly resistant to separation by vibration.

A still further object of the invention is to provide an improved disconnectable coupling assembly for use between an irrigation supply conduit and an irrigation head or upright, or for use between any fluid supply line and a conduit leading to a fluid-receiving device, said assembly involving the use of merely a few, relatively simple, parts, being relatively conformable to slight irregularities of the parts with zero or negligible leakage, being highly resistant to vibration, which self-flushes both during the connect and disconnect cycles, thereby minimizing contamination, and which provides a tight sealing action while disconnected, to thereby prevent loss of fluid under these conditions.

BRIEF DESCRIPTION OF THE DRAWINGS

Further objects and advantages of the invention will become apparent from the following description of preferred exemplary modes of the invention as shown in the accompanying drawings, wherein:

FIG. 6 is a longitudinal vertical cross-sectional view similar to FIG. 3 but showing a modified form of coupling assembly according to the present invention.

FIG. 7 is an enlarged fragmentary cross-sectional view taken substantially on line 7—7 of FIG. 6.

FIG. 8 is an enlarged fragmentary, partly diagrammatic cross-sectional view illustrating the improved sealing action obtainable with the modified form of assembly of FIG. 6.

FIG. 9 is a fragmentary cross-sectional view taken substantially on line 9—9 of FIG. 7.

DESCRIPTION OF PREFERRED EMBODIMENTS

Figure 1:
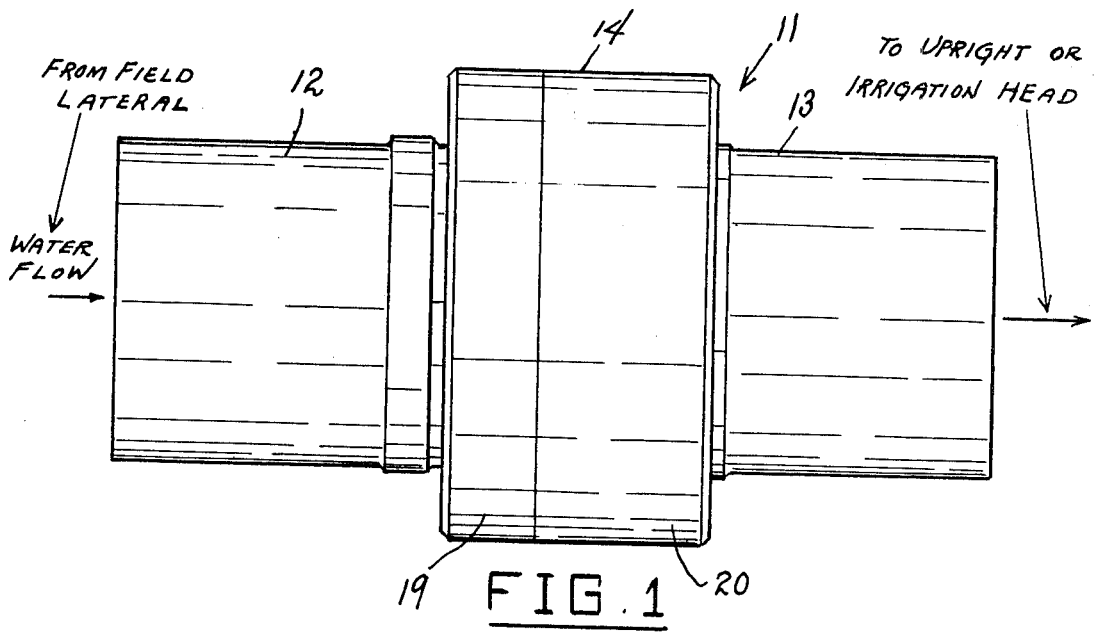
FIG. 1 is a side elevational view of an improved disconnectable coupling assembly constructed in accordance with the present invention.

Referring to the drawings, and more particularly to FIGS. 1 to 5, a typical disconnect coupling assembly according to the present invention is generally designated at 11 and comprises a first conduit portion 12 which is connected to the lateral or field supply line of an irrigation system, a second conduit portion 13 connected to an upright or irrigation head and a clamping ring 14 rotatably mounted on the first conduit portion 12, arranged to hold portions 12 and 13 in axially aligned mating positions, as will be presently described.

The material used for the parts of the assembly may be any of the semi-resilient plastics, such as polyvinyl chloride or any of the moldable organic (plastic) compounds, cellulose, acrylics, polystyrenes, or other thermoplastic polymers. The parts may be formed by injection molding and sonic-welded or cemented together.

Figure 2:
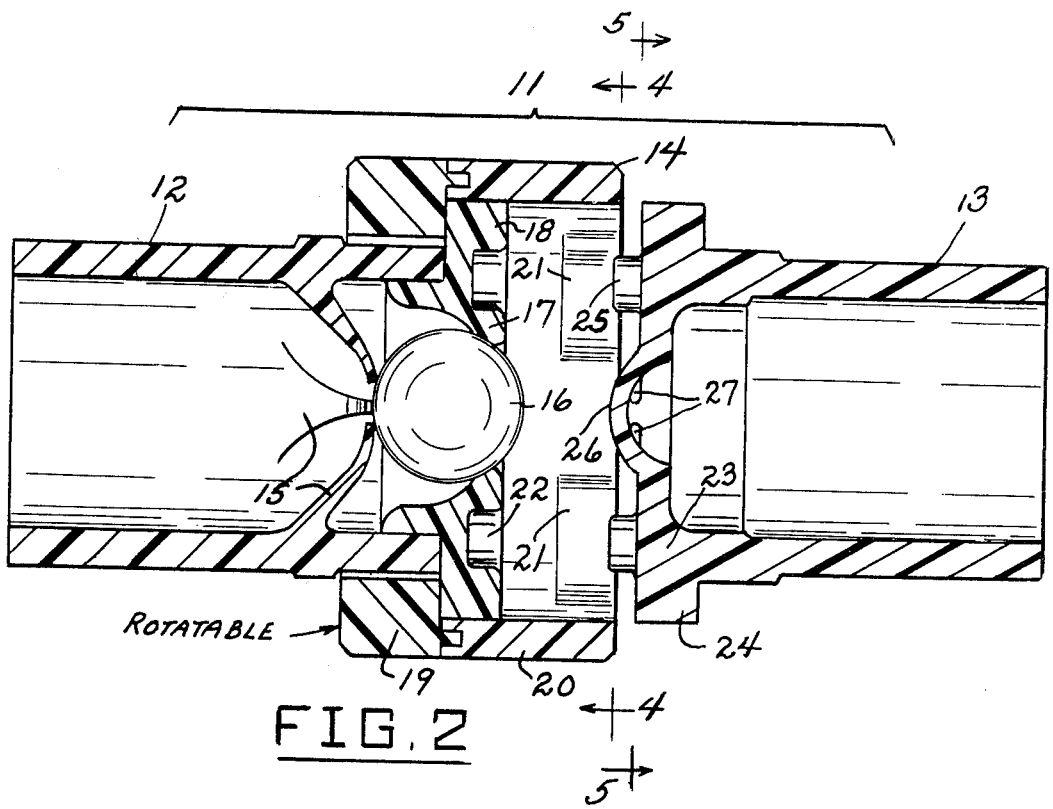
FIG. 2 is a longitudinal vertical cross-sectional view of the assembly of FIG. 1, with the main conduit portions in disconnected positions.

Conduit portion 12, which is the field line inlet fitting, comprises a generally tubular main body integrally formed with a set of uniformly spaced internal spring fingers 15 which extend inwardly and rightwardly, as viewed in FIG. 2, and which resiliently bear at their inner ends on a valve ball 16, urging said ball 16 toward an annular semi-resillient seat member 17 secured in the right end of conduit portion 12 and being provided with an annular outer peripheral abutment flange 18 which projects outwardly relative to the peripheral wall of conduit portion 12.

Rotatably mounted on the end of the conduit portion 12 over the flange 18 is the clamping ring member 14, comprising a rotatable ring element 19 to which is rigidly secured a cylindrical skirt portion 20. The ring element 19 is arranged to bear against the back of the flange 18, while still being rotatable thereagainst, and the flange 18 is received in the skirt portion 20 which rotates with the ring 19 against the flange 18. The skirt portion 20 is integrally formed with a plurality of evenly spaced, inwardly projecting, radical abutment lugs 21 located at its peripheral rim, as is shown in FIG. 2. The seat member 17 is formed with a plurality of guide recesses 22 spaced uniformly around the axis of the seat member.

Figure 3:
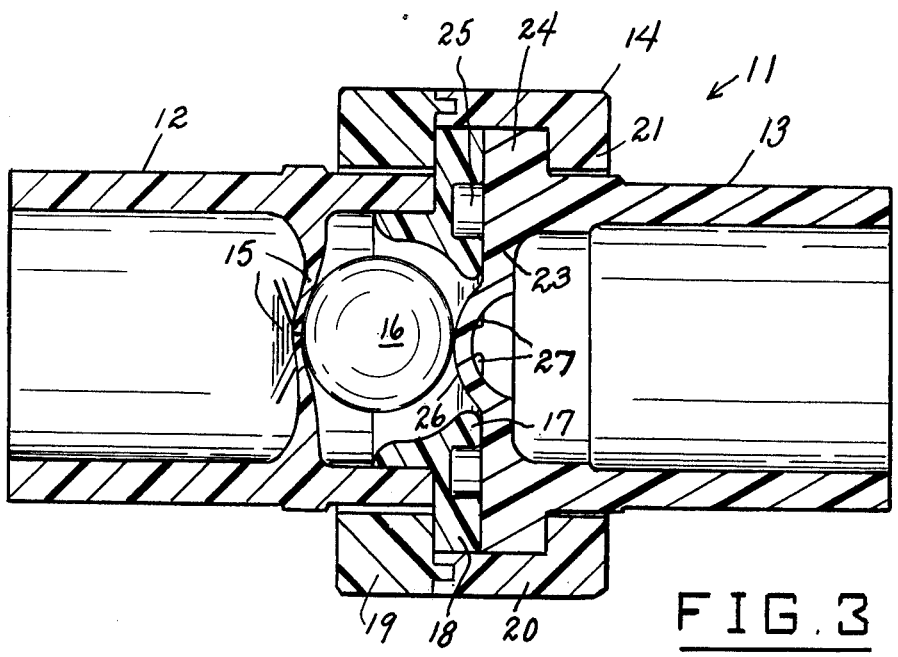
FIG. 3 is a longitudinal vertical cross-sectional view of the assembly of FIG. 1, with the main conduit portions in mating connected positions.
Figure 4:
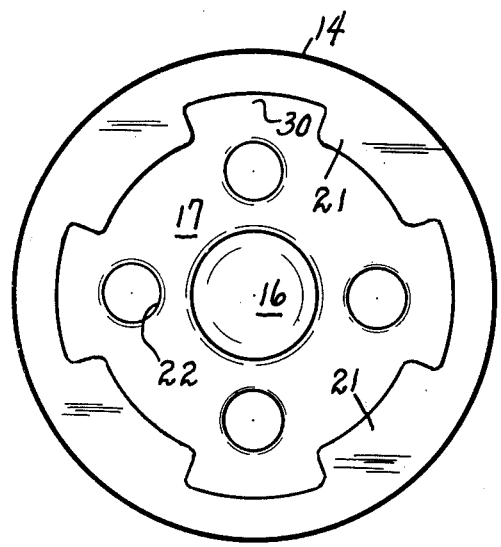
FIG. 4 is a transverse vertical sectional view taken substantially on line 4—4 of FIG. 2.
Figure 5:
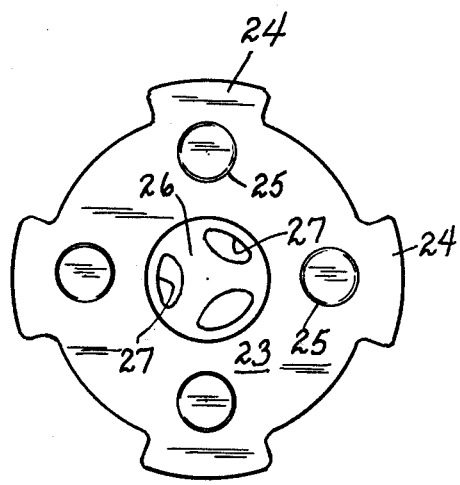
FIG. 5 is a transverse vertical sectional view taken substantially on line 5—5 of FIG. 2.

The conduit portion 13, which is connected to the irrigation head, comprises a generally tubular main body with an end wall 23 which has outwardly projecting radial locking lugs 24 located and shaped to be slidably received in the skirt portion 20 between respective pairs of adjacent lugs 21, the wall 23 being engageable against the seat member 17 and having lugs 25 complementary in shape and slidably receivable in the guide recesses 22 of the seat member 17 for assuring axial alignment of the conduit portions 12 and 13. With the wall 23 substantially in abutment with the seat member 17, the ring member 14 may be rotated to cause the inside surfaces of the lugs 21 to lockingly engage with the lugs 24 to clampingly lock the conduit portions 12 and 13 together in axial alignment, as shown in FIG. 3.

In the typical embodiment herein illustrated in FIGS. 1 to 5, the radial lugs 21 on member 14 and the spaces between said lugs, shown at 30, subtend angles of approximately 45°. The radial lugs 24 on wall member 23 are spaced 90° aparts and also subtend angles of approximately 45°, being contoured so as to allow them to enter the spaces 30 between the radial lugs 21 when the conduit portion 13 is moved toward coupling position with conduit portion 12. Thus, to lock the conduit portions together in axial alignment, namely, with the lugs 25 received in the recesses 22, the ring member 14 is rotated through an angle of about 45° from its nonholding position of FIG. 2 to its clamping position of FIG. 3, which substantially aligns the retaining lugs 21 of ring member 14 behind the engaged inwardly adjacent radial lugs 24 of conduit portion 13.

Wall 23 is centrally formed with an integral hollow nose portion 26, projecting leftwardly as viewed in FIG. 2, and being formed with a plurality of uniformly angularly spaced flow apertures 27. When the conduit portions 12 and 13 are clamped together in axial alignment, as above described, the relatively rigid nose portion 26 pushes valve ball 16 leftwardly off its seat 17 against the spring pressure exerted by the resilient integral fingers 15 of conduit portion 12, as shown in FIG. 3, whereby water may flow freely through the coupled conduit portions 12, 13. As ball 16 becomes unseated during the coupling procedure and before final mutual positioning of the conduit portions and clamping by the ring member 14, water is allowed to flush through the still-unsealed space between the mating conduit end portions and to thereby wash away and remove dirt or other contaminating material. This flushing action cleans the mating parts before they are clamped together by the above-described rotation of ring member 14. A similar flushing action takes place during the reverse procedure, namely, when the conduit portion 13 is disconnected from the inlet fitting 12. Thus, with the portions 12 and 13 clamped together in axial alignment as in FIG. 3, the ring member 14 may be rotated so as to disengage lugs 21 from lugs 24 and to allow the conduit portion 13 to be moved away from seat member 17. Nose member 26 moves rightwardly from its position of FIG. 3 and allows ball 16 to reseat against the sealing rim of member 17. Before seating occurs there is a flushing action which clears dirt or other contaminating material out of the coupling assembly. With ball 16 seated, no further leakage occurs after conduit portion 13 has been disconnected from the field supply line.

It will thus be seen that with the above-described assembly, an irrigation head may be readily disconnected from the field lateral, or supply conduit, for repair, replacement, or the like, without the necessity of completely shutting off the lateral or supply pipe, and thus without interrupting the water supply to the other irrigation heads, the above-described disconnect device allows any one head to be disconnected from the lateral without affecting any other head. Earlier disconnect devices have been unsuccessful in that they develop contamination and therefore do not fully shut off, or upon reconnection tend to force contaminants into the upright, thereby plugging the head. The device of the present invention avoids such contamination because of the self-flushing action above described, which occurs automatically during disconnection and re-connection. The nose member 26 engages in the ball seat central aperture in the clamped position of FIG. 3 and is of substantial axial length. This axial length determines the degree of unseating of ball 16 and the amount of flushing which takes place during disconnection and re-connection.

FIGS. 6 to 9 illustrate another form of the present invention. The modified form of coupling assembly of FIGS. 6 to 9 is designated generally at 111. The assembly 111 comprises a first conduit portion 112, adapted to be connected in any suitable manner to the fluid supply line of a fluid distribution system, a second conduit portion 113, adapted to be connected to a fluid-receiving device, such as a sprinkler head, or the like, for example by conduit means having an externally threaded end portion threadedly engageable with internal threads 120 provided in portion 113, and a clamping ring assembly 114 surrounding the abutting mating ends of the conduit portions 112 and 113 and arranged to hold said portions in axially aligned mating positions. Thus, conduit portions 112 and 113 are provided with the respective annular end flanges 118 and 124 received within and being clampingly engageable by the ring assembly 114.

Ring assembly 114 comprises a first inwardly flanged ring member 119 rotatably mounted on conduit portion 112 and having an internally threaded cylindrical skirt portion 121, and a second inwardly flanged ring member 122 having a reduced externally threaded cylindrical skirt portion 123 threadedly engaged in skirt portion 121. The abutting face of conduit portion 112 has alignment recesses 22 which receive alignment lugs 25 on the abutting face of conduit portion 113 to assure proper axial alignment of said conduit portions, similar to the structure provided for this purpose in the first-described embodiment of the invention.

The conduit portion 113 is preferably formed of semi-resilient plastic material, such as polyvinyl chloride, whereas the conduit portion 112 and the ring segments 119 and 122 may be of metal, such as aluminum, or other relatively rigid material.

The end abutment wall 125 of conduit portion 113 is centrally formed with an integral relatively flexible hollow conical nose portion 126 with a plurality of flow apertures 27. The base of conical nose portion 126 is formed with an outwardly facing concave annular shoulder 127. Axial inward force exerted on the apex 130 of the nose portion tends to resiliently deform the conical nose portion so as to shorten its height and expand its base, namely, tends to reduce the outer corner radius of the shoulder 127 and urge the annular shoulder outwardly to increase its main diameter.

The relatively rigid conduit portion 112 has an end wall formed with a central aperture having an annular sealing rim 131 engageable around the conical nose portion 126 when the conduit portions 112 and 113 are clamped together in mating relationship, as shown in FIG. 6, with the rim 131 conformably and sealingly engaged in the concave outer corner of the annular shoulder 127. When inward axial force is exerted on conical nose 126, the conical nose is resiliently expanded, as above described, and increases its sealing pressure on rim 131.

Rim 131 is formed on its inner side with an annular ball seat 132 adapted to conformably sealingly receive a valve ball 16, preferably of molded plastic material, such as polyethylene, or the like. Ball 16 is normally urged toward ball seat 132 by a plurality of inwardly extending substantially radial spring fingers 115 integrally formed on the inner end of a sleeve member 133 threadedly engaged in conduit portion 112. Sleeve member 133 is preferably made of semi-resilient material, such as polyvinyl chloride, or the like. As in the previously-described embodiment of the invention, spring fingers 115, and the pressure of the supply fluid, hold the ball 16 sealingly on the seat 132 when the conduit portion 113 is disconnected from the conduit portion 112. When the conduit portions 112 and 113 are clamped together in mating relationship, the above-described flushing action takes place as the ball 16 is unseated by the engagement thereof by the nose member 126. As the flanges 118 and 124 are clamped together by the ring assembly 114, the expansive force exerted on nose member 126, as above described, increases the sealing pressure between annular shoulder 127 and rim 131.

When the conduit portion 113 is disconnected from the conduit portion 112, flushing action again takes place as ball 16 moves towards its seat 132, as in the previously-described embodiment shown in FIGS. 1 to 5.

The inside radial face of ring 122 and the adjacent annular radial face of flange 124 are formed with cooperating interlocking serrations 141, 142 which hold the parts 124, 122 against relative rotation when portions 112 and 113 are connected together in mating relationship, even under conditions of severe vibration, and thereby prevent loosening of the connection therebetween. Preferably, the serrations taper convergently outwardly in height, for example, at a taper angle of about 1°30', as shown in FIG. 9. The cooperating serrations therefore provide anti-vibration locking between members 113 and 112, and also provide a holding action to allow manual tightening or loosening of ring member 119 relative to ring member 122, as required, by preventing undesired rotation of ring member 122 with respect to flange 124 during such manual tightening or loosening.

The self-flushing ball seal disconnect devices above described are adaptable for use in a wide variety of fluid distribution systems, such as in hydraulic lines, pneumatic lines, and for domestic irrigation purposes. For example, they provide a means to directly connect metal pipe risers, presently in use in some areas of the world, and standard impact, and shower, type sprinkler heads.

While certain specific embodiments of an improved self-flushing ball seal coupling assembly for use in fluid distribution systems have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A self-flushing disconnect coupling assembly for liquid flow systems comprising: an inlet conduit portion adapted to be connected to a liquid supply line; a valve seat on said inlet conduit portion; a movable valve element in said inlet conduit portion sealingly engageable with said seat; spring means in the inlet conduit portion bearing on said valve element and urging it toward said seat, said spring means being integral and unitary with said inlet conduit; an outlet conduit portion; means to detachably couple said outlet conduit portion to said inlet conduit portion, said coupling means including mating means on said inlet and outlet conduit portions; and means to allow flushing of the conduit portions including the mating means during uncoupling and re-coupling, comprising an unseating projection on said outlet conduit portion engageable with said valve element to unseat it responsive to the coupling of said outlet conduit portion whereby said unseating projection unseats said valve element to allow escape of liquid thereby providing flushing of the conduit portions and mating means during uncoupling and re-coupling.

2. The coupling assembly of claim 1 formed of plastic, and wherein said valve element comprises a valve ball and said seat is located at the end of said inlet conduit portion and is of annular shape to receive said ball.

3. The coupling assembly of claim 1, and wherein said means to detachably couple the conduit portions comprises a ring member rotatably mounted on one of the conduit portions and cooperating locking means on said ring member and the other conduit portion.

4. The coupling assembly of claim 3, and wherein said ring member is rotatably mounted on said inlet conduit portion.

5. The coupling assembly of claim 3, and wherein said cooperating locking means comprises at least one inwardly extending lug on said ring member and at least one outwardly extending lug on said other conduit portion lockingly engageable with said inwardly extending lug.

6. The coupling assembly of claim 3, and wherein said ring member is rotatably mounted on said inlet conduit portion and wherein said inlet conduit portion has a retaining flange rotatably engageable by said ring member, and wherein said cooperating locking means comprises at least one inwardly extending lug on said ring member and at least one outwardly extending lug on said outlet conduit portion lockingly engageable with said inwardly extending lug to hold the ring member against said retaining flange.

7. The coupling assembly of claim 1, wherein said mating means includes cooperating means on the inlet and outlet conduit portions to hold them substantially in axial alignment, said cooperating aligning means comprising a plurality of spaced axially extending projections on one of the conduit portions, the other conduit portion being formed with respective recesses shaped to conformably slidably receive said axially extending projections.

8. The coupling assembly of claim 7, and wherein said plurality of axially extending projections are arranged to extend in a circular pattern about the periphery of the conduit portions.

9. The coupling assembly of claim 1, and wherein said valve element comprises a valve ball and said seat is located at the end of said inlet conduit portion and is of annular shape to receive said ball, and wherein said unseating projection means comprises a nose element located at the end of the outlet conduit portion and of diameter substantially less than the bore of said valve seat, said nose element being receivable in said seat and engageable with the ball.

10. The coupling assembly of claim 9, and wherein said means to detachably couple the conduit portions comprises a ring member rotatably mounted on said inlet conduit portion, said inlet conduit portion having a retaining flange rotatably engageable by said ring member, at least one inwardly extending lug on said ring member and at least one outwardly extending lug on said outlt conduit portion lockingly engageable with said inwardly extending lug to hold the ring member against said retaining flange, and cooperating means on the inlet and outlet conduit portions to hold them substantially in axial alignment, said alignment-holding means comprising a plurality of spaced axially-extending projections on one of the conduit portions, the other conduit portion being formed with respective recesses shaped to conformably slidably receive said axially extending projections.

11. The coupling assembly of claim 1, and wherein said means to detachably couple the conduit portions comprises a first ring member rotatably mounted on one of the conduit portions, a second ring member mounted on the other conduit portion threadedly engaging said first ring member, and interengaging locking flange means on the ring members and conduit portions.

12. The coupling assembly of claim 11, and anti-vibration cooperating frictional means on the second ring member and said other conduit portion to limit relative rotation thereof.

13. The coupling assembly of claim 1, and wherein said valve element comprises a valve ball and said seat is of annular shape to receive said ball, wherein said unseating projection means comprises a hollow nose element formed with a flow aperture, receivable through said seat, and wherein said inlet conduit portion has an annular sealing rim coaxial with said seat and sealingly engaging around said nose element.

14. A self-flushing disconnect coupling assembly for fluid distribution systems comprising an inlet conduit portion adapted to be connected to a fluid supply line, a valve seat on said inlet conduit portion, a movable valve element in said inlet conduit portion sealingly engageable with said seat, spring means in the inlet conduit portion bearing on said valve element and urging it toward said seat, an outlet conduit portion, means to detachably couple said outlet conduit portion to said inlet conduit portion, and unseating projection means on said outlet conduit portion engageable with said valve element to unseat it responsive to the coupling of said outlet conduit portion to said inlet conduit portion and to hold it away from said seat sufficiently to allow internal flushing of the conduit portions during uncoupling and re-coupling, and wherein said means to detachably couple the conduit portions comprises a first ring member rotatably mounted on one of the conduit portions, a second ring member mounted on the other conduit portion threadedly engaging said first ring member, and interengaging locking flange means on the ring members and conduit portions, and anti-vibration cooperating frictional means on the second ring member and said other conduit portion to limit relative rotation thereof, and wherein said anti-vibration means comprises interlocking serrations on said second ring member and said other conduit portion.

15. The coupling assembly of claim 14, and wherein said serrations taper outwardly convergently in height.

16. A self-flushing disconnect coupling assembly for fluid distribution systems comprising an inlet conduit portion adapted to be connected to a fluid supply line, a valve seat on said inlet conduit portion, a movable valve element in said inlet conduit portion sealingly engageable with said seat, spring means in the inlet conduit portion bearing on said valve element and urging it toward said seat, an outlet conduit portion, means to detachably couple said outlet conduit portion to said inlet conduit portion, and unseating projection means on said outlet conduit portion engageable with said valve element to unseat it responsive to the coupling of said outlet conduit portion to said inlet conduit portion and to hold it away from said seat sufficiently to allow internal flushing of the conduit portions during uncoupling and re-coupling, and wherein said valve element comprises a valve ball and said seat is of annular shape to receive said ball, wherein said unseating projection means comprises a resiliently deformable hollow, apertured, nose element on the outlet conduit portion receivable through said seat and engageable with the ball, and wherein said inlet conduit portion has an annular sealing rim coaxial with said seat and sealingly engaging around said nose element.

17. The coupling assembly of claim 16, and wherein said nose element has an outwardly expansible annular shoulder element conformably engageable in said sealing rim.

18. The coupling assembly of claim 17, and wherein said nose element is substantially of forwardly tapering shape and said shoulder element is formed substantially around the base of the nose element.

19. The coupling assembly of claim 17, and wherein said outlet conduit portion is of semi-resilient material and said nose element is formed integrally with said outlet conduit portion.

20. The coupling assembly of claim 19, and wherein said outlet conduit portion is formed of polyvinyl chloride.

21. A self-flushing disconnect coupling assembly for fluid distribution systems comprising an inlet conduit portion adapted to be connected to a fluid supply line, a valve seat on said inlet conduit portion, a movable valve element in said inlet conduit portion sealingly engageable with said seat, spring means in the inlet conduit portion bearing on said valve element and urging it toward said seat, an outlet conduit portion, means to detachably couple said outlet conduit portion to said inlet conduit portion, and unseating projection means on said outlet conduit portion engageable with said valve element to unseat it responsive to the coupling of said outlet conduit portion to said inlet conduit portion and to hold it away from said seat sufficiently to allow internal flushing of the conduit portions during uncoupling and re-coupling, and wherein said inlet conduit portion is provided with an inner sleeve member of semi-resilient material and wherein said spring means comprises a plurality of inwardly projecting resilient finger elements integrally formed with said sleeve member.

22. The coupling assembly of claim 21, and wherein said inner sleeve member is threadedly engaged in said inlet conduit portion and said resilient finger elements are located at the inner end of said sleeve member.

23. The coupling assembly of claim 22, and wherein said inner sleeve member is formed of polyvinyl chloride.

* * * * *